United States Patent [19]

Pitel

[11] 4,045,711
[45] Aug. 30, 1977

[54] TUNED OSCILLATOR BALLAST CIRCUIT

[75] Inventor: Ira Jay Pitel, Williamsport, Pa.

[73] Assignee: GTE Sylvania Incorporated, Stamford, Conn.

[21] Appl. No.: 668,485

[22] Filed: Mar. 19, 1976

[51] Int. Cl.² ............... H05B 37/02; H05B 39/04; H05B 41/36
[52] U.S. Cl. ............... 315/209 R; 315/DIG. 2; 315/DIG. 5; 315/239; 315/278; 315/205; 315/265; 331/113 A
[58] Field of Search ............... 315/DIG. 5, DIG. 7, 315/DIG. 2, 239, 278, 205, 112, 113, 219, 220, 233, 257, 265, 260, 274, 266; 331/113 A

[56] References Cited
U.S. PATENT DOCUMENTS

| | | | |
|---|---|---|---|
| 3,008,068 | 11/1961 | Wilting et al. | 331/113 A |
| 3,611,021 | 10/1971 | Wallace | 331/113 A |
| 3,723,848 | 3/1973 | Miller | 331/113 A |
| 3,753,076 | 8/1973 | Zelina | 315/DIG. 7 |
| 3,754,160 | 8/1973 | Jensen | 331/113 A |
| 3,758,841 | 9/1973 | Bourbeau | 331/113 A |
| 3,769,545 | 10/1973 | Crane | 315/DIG. 7 |
| 3,889,153 | 6/1975 | Pierce | 315/DIG. 7 |

Primary Examiner—Saxfield Chatmon, Jr.
Attorney, Agent, or Firm—Norman J. O'Malley; Thomas H. Buffton; Robert T. Orner

[57] ABSTRACT

A fluorescent lamp ballast circuit includes a tuned oscillator coupled to a pulsed DC potential source and to a transformer having a first winding directly connected to the oscillator and in series connection with a capacitor to form a series resonant circuit. A second winding of the transformer inductively couples the first winding of the transformer to the oscillator, a third winding inductively couples a load across the capacitor of the series resonant circuit, and a fourth winding is inductively coupled to the first winding of the transformer and clamps the DC potential source to a given potential level. Also, protection for open circuits, short circuits, and temperature change due to changed ambient conditions or increased current flow is provided.

13 Claims, 1 Drawing Figure

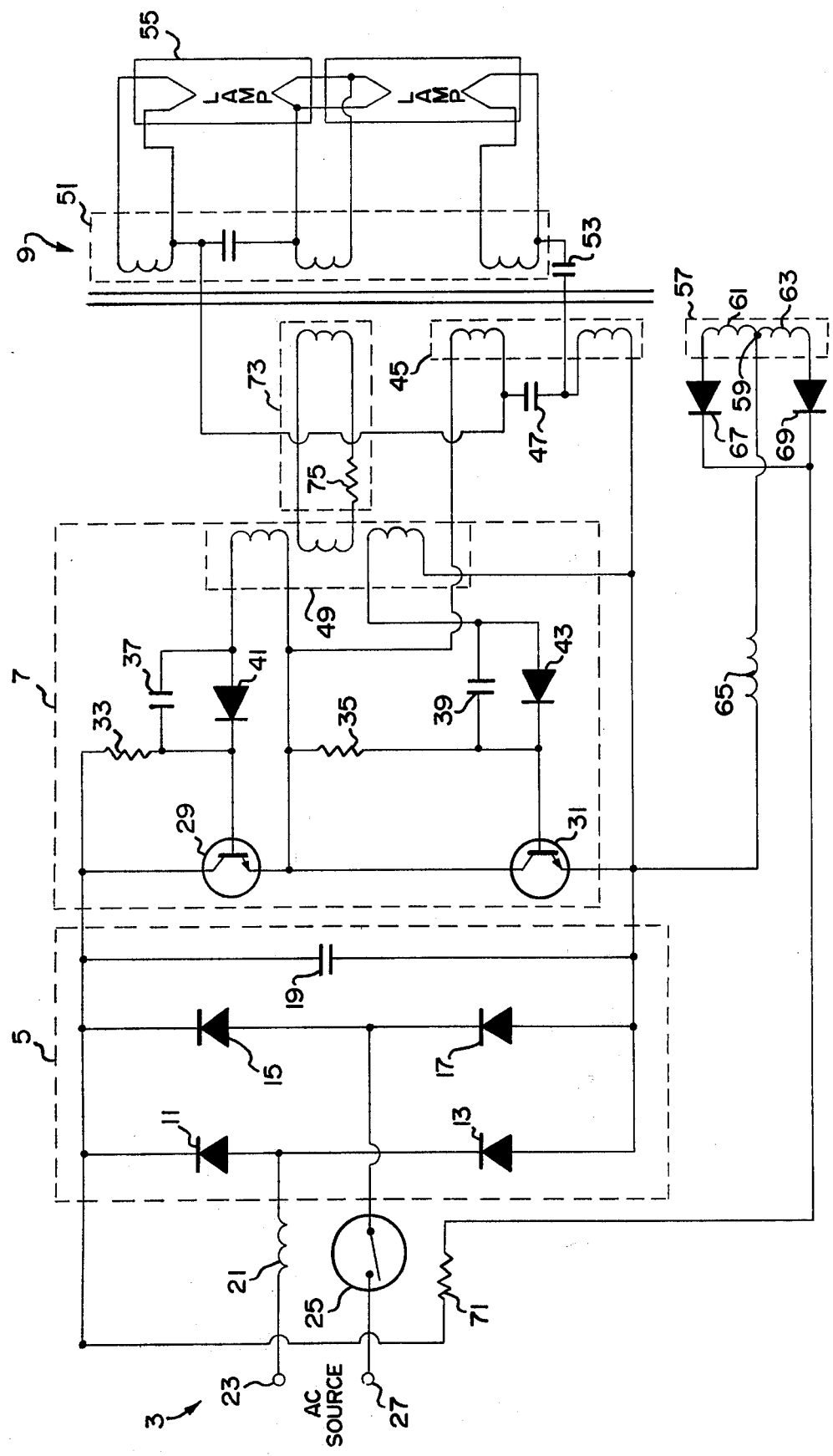

TUNED OSCILLATOR BALLAST CIRCUIT

BACKGROUND OF THE INVENTION

This invention relates to oscillator ballast circuits and is particularly suited to use with 35 and 40-watt fluorescent lamps.

Generally, fluorescent lamp ballast circuits in present-day use are of the auto-transformer type whereby the lamp is rendered non-conductive at a 120-Hz rate. Since auto-transformers are notoriously heavy, inefficient, and expensive, it can readily be seen that such apparatus is undesirable in view of the energy waste, excessive heat generated, and cost. Moreover, the non-conductivity rate of 120 Hz is well within the audio range and tends to provide undesired audible noise.

Another form of lamp ballast circuitry employs a flip-flop type oscillator circuit in cooperation with a saturable core transformer. A transistor of the oscillator saturates and effects saturation of the transformer core material to limit current flow and inhibit lamp burnout. However, core material saturation characteristics are erratic and unpredictable which renders such circuitry undesirable or at best, most difficult to predict or control.

In still another known form of ballast circuitry, an oscillator circuit is combined with a series resonant inductor and capacitor. Another inductor is placed in series connection with the series resonant circuit and provides drive potentials for the oscillator. Moreover, a load circuit is shunted across the capacitor.

Although the above-described ballast circuit has numerous advantages over other known techniques, it has been found that there are deficiencies which tend to inhibit its use. For example, it has been found that increased current flow through the inductor driving the transistors occurs when the load is removed and this increased current flow causes failure of the transistors of the oscillator circuit. Also, short circuiting the load circuit tends to cause failure of the oscillator transistors. Moreover, several transformers are required and no provision is made for tuning the oscillator circuitry to effect switching of the transistors at a minimum or zero current level whereby power losses are reduced. Also, no provisions are made for power factor correction.

OBJECTS AND SUMMARY OF THE INVENTION

An object of the present invention is to provide an enhanced oscillator ballast circuit. Still another object of the invention is to provide an oscillator ballast circuit having overload protection. A further object of the invention is to provide an oscillator ballast circuit having both open circuit and short circuit protection circuitry. A still further object of the invention is to provide an improved oscillator ballast circuit having ambient and current flow temperature protection circuitry. A final objective is to provide for power factor correction.

These and other objects, advantages and capabilities are achieved in one aspect of the invention by an oscillator ballast circuit having an oscillator circuit coupled to a pulsed DC potential source and to an output transformer having a first winding connected to the oscillator circuit and to a capacitor forming a series resonant circuit, a second winding inductively coupled to the first winding and to the oscillator circuit to effect drive potentials for the oscillator, a third winding shunting the capacitor and coupled to a lamp load, and a fourth winding inductively coupled to the first winding and to the pulsed DC potential source to effect clamping of the potential source at a given potential level.

BRIEF DESCRIPTION OF THE DRAWINGS

The sole FIGURE illustrates a tuned oscillator ballast circuit for fluorescent lamps and having overload protection circuitry.

DESCRIPTION OF THE PREFERRED EMBODIMENT

For a better understanding of the present invention, together with other and further objects, advantages and capabilities thereof, reference is made to the following disclosures and appended claims in conjunction with the accompanying drawing.

Referring to the drawing, a tuned oscillator ballast circuit includes an AC potential source 3 coupled to a DC rectifier means 5. An oscillator circuit 7 is coupled to the DC rectifier means 5 and to a transformer means 9.

More specifically, the DC rectifier means 5 includes first, second, third, and fourth diodes 11, 13, 15, and 17 in a bridge configuration with an RF capacitor 19 shunting the series connected first and second diodes 11 and 13 and the series connected third and fourth diodes 15 and 17. The junction of the first and second diodes 11 and 13 is connected via an RF filter choke 21 to a first terminal 23 of the AC potential source 3. The junction of the third and fourth diodes 15 and 17 is connected via a bi-metal switch 25 to the second terminal 27 of the AC potential source 3.

The oscillator circuit 7 includes first and second transistors 29, and 31, series connected across the RF capacitor 19 of the DC rectifier means 5. Each of the first and second transistors 29 and 31 has a bias circuit coupled to the base thereof with each bias circuit including a resistor 33 and 35; capacitor 37 and 39, and diode 41 and 43 respectively.

A single transformer 9 includes a first inductive winding 45 in series connection with a capacitor 47 to provide a series resonant circuit directly connected to the junction of the first and second series connected transistors 29 and 31 of the oscillator circuit 7. A second inductive winding 49 is loosely coupled inductively to the first inductive winding 45 of the transformer 9 and directly coupled to the bias circuits of each of the first and second transistors 29 and 31 of the oscillator circuit 7. Thus, drive potentials for the first and second transistors 29 and 31 are derived by the inductive coupling to the transformer 9.

A third inductive winding 51 of the transformer 9 is in series connection with a capacitor 53 and shunted across the series resonant circuit which includes the first winding 45 and capacitor 47. This third inductive winding 51 is coupled to a shunting load circuit 55 which in this example is a pair of fluorescent lamps.

A fourth inductive winding 57 of the transformer 9 has a center tap 59 and a pair of output terminals 61 and 63. The center tap 59 is coupled by a high frequency smoothing choke 65 to a common lead of the DC rectifier means 5 and oscillator circuit 7. Each one of the output terminals 61 and 63 of the fourth inductive winding 57 is connected to a diode 67 and 69. The diodes 67 and 69 are connected by a common lead to a resistor 71, associated with the bi-metal switch 25, and coupled to the DC rectifier means 5.

Also, a fifth inductive winding 73 in series connection with an impedance 75 inductively couples a signal from the transformer means 9 to the second inductive winding 49 providing drive signals to the first and second transistors 29 and 31 of the oscillator circuit 7. In this manner, the drive signals are shifted in phase by an amount sufficient to compensate for the well known storage time of the first and second transistors 29 and 31 whereupon transistor switching is effected at the desired zero current level.

As to operation of the tuned oscillator ballast circuit, a potential from the AC potential source 3 is applied via the RF filter choke 21 and the bi-metal switch 25 to the bridge configuration of the DC rectifier means 5. The DC rectifier means 5 provides a 120 Hz pulsating DC potential which is applied to an oscillator circuit 7 operating, in this example at a frequency of about 33 KHz.

Ordinarily, current flows through the series connected first inductive winding 45 and capacitor 47, which are series resonant at the oscillating frequency of the oscillator circuit 7, and through the load circuit which includes the third inductive winding 51 and capacitor 53 shunting the series resonant circuit of the first winding 45 and capacitor 47. Obviously, the load circuit includes the shunt coupled flourescent lamps 55.

Also, the fifth inductive winding 73 is inductively coupled to the first inductive winding 45 and to the second loosely coupled winding 49 for providing drive signals to the oscillator circuit 7. The fifth inductive winding 73 in conjunction with the impedance 75 serves to cause the base current to lead the collector current of the first and second transistors 29 and 31 by several degrees. In this manner, compensation is made for the storage time and the transistors switch at zero current whereupon power losses are substantially eliminated or at least reduced.

Assuming a condition where the flourescent lamps are removed or the load appears as an open circuit, it can be seen that current flow through the series resonant circuit of the first winding 45 and capacitor 47 will tend to be greatly increased. In other words, the resonant circuit will substantially short circuit the oscillator circuit 7 causing a greatly increased current flow through the first and second transistors 29 and 31. Thus, burning out of the oscillator circuit 7 will occur.

However, the above-mentioned undesired increase in current flow through the series resonant circuit and burn out of the transistors of the oscillator circuit 7 is substantially eliminated by the addition of the fourth inductive winding 57 and associated diodes 67 and 69. As the current flow increases through the series resonant circuit, which includes the first winding 45 and capacitor 47, the potential at the fourth winding 57 increases causing conduction of the diodes 67 and 69. Thereupon, current is fed back to the DC rectifier 5 to prevent further increase in potential thereacross. Thus, the diodes 67 and 69 serve to effect clamping of winding 57 and inhibit an unrestrained increase in current through winding 45 which would be deleterious to the oscillator circuit 7.

Further, a short circuit of the load circuit 55 would effectively cause the capacitor 53 to parallel the capacitor 47 of the series resonant circuit. As a result, the resonant frequency of the series resonant circuit would be shifted. However, the capacitor 47 would not be short circuited and the potential applied to the oscillator circuit 7 would be insufficient to effect destruction of the components.

Additionally, the bi-metal switch 25 which is included in the circuitry to provide protection from undesired ambient temperature increases is also utilized to effect protection of undesired current increases. Specifically, by placing the impedance 71, a resistor in this example, in the immediate area of the bi-metal switch 25, any increase in current flow in the series resonant circuit which is translated into current flow in the clamping circuitry 57 serves to activate the bi-metal switch 25. In this manner the AC potential source is interrupted for a period sufficient to serve as a warning of improper operation of the apparatus.

Since no energy is stored in the RF capacitor 19, the input current is sinusoidal and in phase with the AC potential source 3. The 33 KHz current drawn by oscillator 7 is filtered from the AC potential source 3 by the RF filter choke 21 and RF capacitor 19. Thus, power factor is corrected and near unity since the AC source's voltage and current are in phase and non-distorted.

As an example but in no way limiting the disclosure, the following circuit values are appropriate:

| Transformer: | |
|---|---|
| ⅓ First Winding 45 | 42-turns #36 wire - 22 strands |
| ⅓ Second Winding 49 | 75-turns #26 wire |
| ⅓ Third Winding 51 | 1.5 turns #26 wire |
| ⅓ Fourth Winding 57 | 40-turns #36 wire - 22 strands |
| Fifth Winding 73 | 3-turns #26 wire |
| Capacitors: | |
| C47 | 0.047 uf-600" |
| C53 | 0.22 uf-100" |
| C19 | 0.47 uf-200" |

Thus, there has been provided a unique high power factor tuned oscillator ballast circuit especially suitable for use with 35 and 40 watt flourescent lamps. The apparatus is fabricated of light weight components which have improved efficiency and reduced heat developing characteristics as compared with other known apparatus. Operation is at a frequency above the audio range whereby undesired noise is virtually eliminated.

Also, the apparatus includes thermal protection as well as protection upon removal of the load or lamps from the circuitry.

Further, short circuit protection is afforded in case of undesired short circuiting of the load circuit. Moreover, added warning indication and apparatus responsive to undesired current increases in the circuitry further protect the apparatus from deleterious effects.

While there has been shown and described what is at present considered a preferred embodiment of the invention, it will be obvious to those skilled in the art that various changes and modifications may be made therein without departing from the invention as defined by the appended claims.

What is claimed is:
1. A tuned oscillator ballast circuit comprising:
a pulsed DC potential source;
oscillator means coupled to said pulsed DC potential source;
first inductive means including a first winding directly coupled to said oscillator means and in series connection with a charge storage means to form a series resonant circuit shunting said oscillator means;
second inductive means including a second winding directly connected to said oscillator means to provide drive signals therefor;

third inductive means including a third winding in shunt connection across said charge storage means of said series resonant circuit and coupled to lamp circuitry to form a load circuit;

fourth inductive means including a fourth winding inductively coupled to said first inductive means and directly connected by a pair of diodes to said pulsed DC potential source to effect clamping thereof at a given potential level whereby said given potential level is maintained despite open circuiting of said load circuit and increased current flow through said charge storage means; and power factor correcting circuit means in the form of a capacitor shunting and an inductor coupling said pulsed DC potential source to an AC potential source.

2. The tuned oscillator ballast circuit of claim 1 wherein said first, second, third and fourth windings of said inductive means are in the form of windings on a single transformer.

3. The tuned oscillator ballast circuit of claim 1 including a fifth inductive means in the form of a series connected impedance and fifth winding inductively coupling said first inductive means to said second inductive means connected to said oscillator means, said fifth inductive means effecting a phase shift of current applied to said oscillator means to compensate for storage time of said oscillator means and effect switching thereof at a zero current point whereby switching losses are minimized.

4. The tuned oscillator ballast circuit of claim 1 wherein said third inductive means includes a second charge storage means in series connection with said third winding whereby short circuitry of said third winding or lamp circuitry causes shunting of said first charge storage by said second charge storage means to effect a shift in resonant frequency of said series resonant circuit.

5. The tuned oscillator ballast circuit of claim 1 wherein said pulsed DC potential source is in the form of a full wave rectifier coupled to an AC potential source.

6. The tuned oscillator ballast circuit of claim 5 including a bi-metal switch coupling said AC potential source to said rectifier means to provide ambient temperature protection for said tuned oscillator ballast circuit.

7. The tuned oscillator ballast circuit of claim 6 including an impedance series coupling said pair of diodes of said fourth inductive means to said pulsed DC potential source and in contiguous association with said bi-metal switch whereby increased current flow in said fourth inductive means causes increased current flow through said impedance and increased heating of said bi-metal switch to effect interruption of potential from said AC potential source.

8. A tuned oscillator ballast circuit comprising:
an AC potential source;
a bi-metal switch connected to said AC potential source;
a DC rectifier means coupled to said AC potential source and to said bi-metal switch;
oscillator means including first and second series connected transistors shunting said DC rectifier means; and
transformer means coupled to said oscillator means, said transformer means including;
 a. a first inductive winding and a capacitor forming a series resonant circuit shunting said oscillator means;
 b. a second inductive winding inductively loosely coupled to said first inductive winding and directly coupled to said oscillator means;
 c. a third inductive winding shunt connected across said capacitor of said series resonant circuit, said winding coupled to a load circuit; and
 d. a fourth inductive winding inductively coupled to said first inductive winding, said fourth inductive winding having a center tap coupled to said oscillator circuit with opposing ends of said winding each coupled to a diode connected to said DC rectifier means to effect clamping of said output of said DC rectifier at a given potential level.

9. The tuned oscillator ballast circuit of claim 8 including an RF filter means in the form of an inductor coupling said AC potential source to said DC rectifier means and a capacitor shunting said DC rectifier means.

10. The tuned oscillator ballast circuit of claim 8 including a fifth inductive means in the form of a fifth inductive winding in series connection with an impedance, said fifth inductive winding inductively coupling said first inductive winding to said second inductive winding of said transformer means for effecting a phase shift in current applied to said oscillator means to compensate for storage time of said oscillator means and effect switching thereof at a substantially zero current level whereby switching losses are minimized.

11. The tuned oscillator ballast circuit of claim 8 including an impedance series coupling said diodes connected to said fourth inductive winding to said DC rectifier means, said impedance in heat responsive relationship to said bi-metal switch whereby increased current flow through said impedance causes activation of said bi-metal switch to effect disconnection of said AC potential source from said DC rectifier means.

12. The tuned oscillator ballast circuit of claim 8 wherein said oscillator means includes a pair of substantially identical transistors series connected across said DC rectifier means and said second inductive windings includes first and second windings with each of said first and second windings connected to one of said pair of transistors of said oscillator means.

13. The tuned oscillator ballast circuit of claim 8 including a second capacitor series connected to said third inductive winding and in parallel connection with said capacitor of said series resonant circuit upon short-circuiting of said third inductive winding by said load circuit.

* * * * *